US011655188B2

(12) United States Patent
Pipilikaki

(10) Patent No.: US 11,655,188 B2
(45) Date of Patent: May 23, 2023

(54) FLEXIBLE CONCRETE

(71) Applicant: Nederlandse Organisatie voor toegepast-natuurwetenschappelijk onderzoek TNO, s-Gravenhage (NL)

(72) Inventor: Panagiota Pipilikaki, Voorburg (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 47 days.

(21) Appl. No.: 17/299,081

(22) PCT Filed: Dec. 13, 2019

(86) PCT No.: PCT/NL2019/050835
§ 371 (c)(1),
(2) Date: Jun. 2, 2021

(87) PCT Pub. No.: WO2020/122726
PCT Pub. Date: Jun. 18, 2020

(65) Prior Publication Data
US 2022/0064067 A1 Mar. 3, 2022

(30) Foreign Application Priority Data

Dec. 14, 2018 (EP) ................................ 18212625

(51) Int. Cl.
| C04B 24/26 | (2006.01) |
| C04B 14/28 | (2006.01) |
| C04B 18/08 | (2006.01) |
| C04B 28/00 | (2006.01) |
| C04B 28/06 | (2006.01) |
| C04B 111/50 | (2006.01) |
| C04B 111/60 | (2006.01) |

(52) U.S. Cl.
CPC .......... C04B 24/2623 (2013.01); C04B 14/28 (2013.01); C04B 18/08 (2013.01); C04B 28/001 (2013.01); C04B 28/006 (2013.01); C04B 28/06 (2013.01); C04B 2111/50 (2013.01); C04B 2111/60 (2013.01)

(58) Field of Classification Search
CPC ..... C04B 14/28; C04B 18/08; C04B 24/2623; C04B 28/001; C04B 28/006; C04B 28/06; C04B 2111/50; C04B 2111/60
See application file for complete search history.

(56) References Cited

U.S. PATENT DOCUMENTS 10,392,308 B2 * 8/2019 Cui .................. B32B 13/06

FOREIGN PATENT DOCUMENTS

| CN | 108409233 A | * | 8/2018 | ............. C04B 28/00 |
| EP | 1491516 A2 | | 12/2004 | |
| JP | 55158153 A | * | 12/1980 | |
| JP | 56092153 A | * | 7/1981 | |
| JP | 57067056 A | * | 4/1982 | |
| KR | 9210182 B1 | * | 11/1992 | |
| WO | 2016122935 A1 | | 8/2016 | |

OTHER PUBLICATIONS

Kim et al. "The effect of water soluble polymer on the flexural strenght and moisture sensitivity in MDF cement composites" Journal of the Korean Ceramic Society, vol. 29(4), Dec. 31, 1992, pp. 298-304.

* cited by examiner

Primary Examiner — Anthony J Green
(74) Attorney, Agent, or Firm — Banner & Witcoff, Ltd.

(57) ABSTRACT

The invention relates to a cement powder blend comprising, based on total weight
 45-90 wt. % non-Portland cement;
 5-30 wt. % polyvinylalcohol; the blend having a content of
 0-25 wt. % siliceous fly ash; and
 0-25 wt. % limestone, preferably polyvinylalcohol having a size distribution with $D_{10}$=170-270 μm, $D_{50}$=370-450 μm, $D_{90}$=690-850 μm and $D_{100}$=1000-1300 μm.
Further the invention relates to concrete composed of a blend according to the invention and aggregate.

28 Claims, No Drawings

FLEXIBLE CONCRETE

RELATED APPLICATIONS

This application is a National Stage Application under 35 U.S.C. 371 of co-pending PCT application PCT/NL2019/050835 designating the United States and filed Dec. 13, 2019; which claims the benefit of EP application number 18212625.0 and filed Dec. 14, 2018, each of which are hereby incorporated by reference in their entireties.

The invention relates to a cement powder blend, to a construction slurry, a hardened construction slurry, in particular a hardened cement slurry, such as a hardened cement paste, to concrete that can be made using a cement powder blend according to the invention, and to a construction comprising concrete according to the invention.

Concrete is a much used construction material for various types of constructions, including infrastructural constructions, such as roads, dams, landing strips for airplanes etc., and buildings. Important characteristics include tensile strength, elasticity, ductility, thermal stability and material density. It is generally a challenge to improve on one characteristic without adversely affecting another characteristic. For example, a relatively low tensile strength and ductility of a concrete are usually counteracted by the inclusion of reinforcement, such steel or fibrous reinforcement materials. However, such reinforced concrete usually has a relatively low elasticity.

Concrete is typically made by curing an aqueous slurry of cement. The slurry may contain other inorganic components, such as aggregate (such as sand or gravel). Further, organic additives may be included in the slurry. These can be included to facilitate handing of the slurry, or improve a property of the concrete.

E.g. U.S. Pat. No. 4,069,062 relates to additives for mortar and concrete to improve the plasticity, the workability or pumping properties of mortar and concrete in the form of aqueous dispersions. It teaches away from using additives in the powder state.

U.S. Pat. No. 4,585,486 relates to a process for preparing a cement composition wherein a viscosity increasing agent, e.g. a polyvinylalcohol (PVA), is added to a fluid cement composition. This agent acts as a debubbling agent to remove only large size bubbles from the fluid composition, which bubbles would adversely affect the strength of the cement mass after hardening.

WO2002/066395 relates to a building material that is produced by mixing a cementitious material, a PVA bonding agent, coated fly ash and/or elastomeric beads with water to form a slurry and allow the slurry to hydrate and set.

There remains a need for alternative cement composition to prepare concrete from, in particular a cement composition that is suitable to prepare a construction slurry, in particular a cement slurry, such as a cement paste, from with a relatively low viscosity preferably in combination with a relatively low shrinking degree upon hardening and/or a relatively low permeability after hardening and/or a relatively high ductility after hardening and/or a relatively high thermal stability after hardening. It is further desired that such cement composition is suitable to prepare a concrete from with a relatively high flexibility (low E-modulus). It would in particular be desirable to provide such alternative which can be used without the need for reinforcing materials such as reinforcing steel or fibres and/or that has a relatively high flexibility without the need for including a phase of an elastomeric material. Further it would be desirable to provide such alternative which also has a good resistance to fatigue and/or a good shear strength between a layer of the concrete and a layer of a different construction material, e.g. asphalt, on top or below the concrete.

It has now been found possible to provide a cement powder blend that fulfils such need.

Accordingly, the invention relates to a cement powder blend comprising, based on total weight
  45-90 wt. % non-Portland cement;
  5-30 wt. % polyvinylalcohol; the blend having a content of
  0-25 wt. % siliceous fly ash; and a content of
  0-25 wt. % limestone.

Further, the invention relates to a cement powder blend comprising non-Portland cement and PVA, wherein the PVA has a size distribution with $D_{10}$=170-270 µm, $D_{50}$=370-450 µm, $D_{90}$=690-850 µm and $D_{100}$=1000-1300 µm; an ester value in the range of 1-250 mg KOH/g, as determinable by EN-ISO 3681:1998, in the range of 5-160 mg KOH/g., preferably in the range of 7-150 mg KOH/g, in particular 7-10 mg KOH/g or 130-150 mg KOH/g and/or the PVA has a viscosity of a 4% aqueous solution at 20° C., as determinable by EN-ISO 12058-1:2002, in the range of 1-40 mPa·s in particular in the range of 1-6 mPa·s of or in the range of 25-30 mPa·s. Said cement powder blend further preferably comprises fly ash, most preferably siliceous fly ash, and/or limestone, preferably in amounts as specified in the present claims and/or description.

The total of non-Portland cement, fly ash (preferably siliceous fly ash), limestone and PVA in the cement powder according to the invention is typically 75-100 wt. %, preferably 80-100 wt. %, more preferably 90-99.5 wt. %, in particular 95-99.0 wt. %.

Further, the invention relates to a method for preparing a cement powder blend according to the invention, comprising dry-blending polyvinylalcohol particles, non-Portland cement particles and—if desired—one or more other ingredients, such as the fly ash, and the limestone.

The invention further relates to a construction slurry, in particular a cement slurry, such as a cement paste, made with a cement powder blend according to the invention. The weight to weight ratio water to the non-Portland cement usually is in the range of 0.2-0.7, preferably in the range of 0.4-0.6.

The invention further relates to a hardened construction slurry, in particular a hardened cement slurry, such as a hardened cement paste, wherein at least a substantial part of the polyvinyl alcohol is present in the form of hybrid particles composed of non-Portland cement and polyvinylalcohol.

The hybrid particles are formed in a method according to the invention. In presence of water, the PVA forms a (physical) bond with a calcium phase, such as the cement and/or limestone. This is, e.g., achieved when mixing the cement powder blend with water to obtain the slurry, in particular a cement paste, and curing it.

The invention further relates to concrete, preferably obtainable by curing (hardening) a construction slurry, in particular a cement slurry, such as a cement paste, according to the invention.

Usually, the concrete according to the invention is composed of at least a cement powder blend (having been formulated into a cement paste) according to the invention and aggregate. Preferably the cement paste provides 5-40 wt. % of the total weight of the concrete and the aggregate 60-90 wt. %. The balance is usually water and optionally one or more additives for concrete (which are known per se).

The invention further relates to a product (e.g. a construction) comprising concrete according to the invention, preferably a product selected from the group consisting of infrastructural elements, such as roads, parking terrains, airplane-landing strips, railway embankments, sound barrier walls and sewers; buildings, such as parking garages, industrial buildings, storage halls, retail centers, residential buildings; concrete ware, such as concrete pipes (e.g. sewer pipes); and elements for pre-fab buildings, such as pre-fab walls, pre-fab floors, pre-fab ceilings.

The invention further relates to the use of a cement powder blend according to the invention or a construction slurry, in particular a cement slurry, such as a cement paste, according to the invention for the preparation of a paving of a road or other infrastructural element; for the preparation of a base course for a road or other infrastructural element; for the manufacture of a floor of a building; for the repair of a concrete structure; for grouting; or as an injection into a concrete structure.

As illustrated by the Examples, the invention provides a concrete with reduced E-modulus.

Unless defined otherwise, all technical and scientific terms used herein have the same meaning as commonly understood by one of ordinary skill in the art.

The term "or" as used herein means "and/or" unless specified otherwise.

The term "a" or "an" as used herein means "at least one" unless specified otherwise.

The term "substantial(ly)" or "essential(ly)" is generally used herein to indicate that it has the general character or function of that which is specified. When referring to a quantifiable feature, these terms are in particular used to indicate that it is for at least 75%, more in particular at least 90%, even more in particular at least 95% of the maximum of that feature.

As used herein, percentages are usually weight percentages unless specified otherwise. Percentages are usually based on total weight, unless specified otherwise.

When referring to a "noun" (e.g. a compound, an additive etc.) in singular, the plural is meant to be included, unless specified otherwise.

When referring herein to a particle size distribution 'Dx' the x refers to the particle diameter corresponding to x % cumulative (from 0 to 100%) undersize particle size distribution. In other words, if particle size $D_x$ is y μm, x % of the weight in the tested sample is provided by particles smaller than y or the weight percentage of particles smaller than y μ is x %. $D_{10}$, $D_{50}$, $D_{90}$ and $D_{100}$ are typical points in particle size distribution analysis.

The term 'slurry' is generally known in the art to describe mixtures of a fluid in which a particulate (e.g. pulverised) material in dispersed that (in unhardened state) is flowable or pumpable. For 'cement slurry', the term 'cement paste' is also commonly used in the art, because generally cement slurries are pasty. The cured (hardened) product of the cement slurry or paste is usually referred to as hardened cement slurry or paste, although the adjective 'hardened' may be omitted when it is clear from the context that the slurry or paste has solidified.

In the context of this application, the term "about" means generally a deviation of 15% or less from the given value, in particular a deviation of 10% or less, more in particular a deviation of 5% or less.

For the purpose of clarity and a concise description features are described herein as part of the same or separate embodiments, however, it will be appreciated that the scope of the invention may include embodiments having combinations of all or some of the features described.

The cement powder blend preferably contains at least 50 wt. % non-Portland cement. The non-Portland cement content of the cement powder blend preferably is 80 wt. % or less, more preferably 75 wt. % or less, in particular 65 wt. % or less, more in particular 60 wt. % or less.

The term Portland cement is generally known in the art. Portland cement is generally classifiable according to ASTM C150 (used primarily in the USA) or the European EN 197 standard. Portland cement is a type of cement produced by heating limestone and clay minerals and grinding the material into a fine powder. Typically a source of calcium sulphate is added to the cement, such as gypsum or anhydrite, typically in an amount of 2-8%, preferably about 5%. Accordingly, the term Non-Portland cement is also generally known in the art as any type of cement other than Portland cement.

Examples of non-Portland cement include pozzolan-lime cement, slag-lime cement, calcium aluminate cement, calcium sulfoaluminate cement, magnesium cements (Sorel, Solidia etc), geopolymer cement.

Particularly good results with respect to setting time have been obtained with calcium aluminate cement. Further, a calcium sulfoaluminate cement is particularly preferred.

Calcium aluminate cement are cements comprising hydraulic calcium aluminates. Calcium aluminates is typically prepared from fusing together a source of calcium such as limestone, with a source of aluminium, such as bauxite. The calcium aluminate cement content of the cement powder blend preferably is 80 wt. % or less, more preferably 75 wt. % or less, in particular 65 wt. % or less, more in particular 60 wt. % or less. If present, the calcium aluminate cement content of the cement powder blend is usually at least 45 wt. %, preferably at least 50 wt. %.

Calcium sulfoaluminate cement is made from material that comprises ye'elimite ($Ca_4(AlO_2)$), which upon hydration forms ettringite ($Ca_6Al_2(SO_4)_3(OH)_{12}.26H_2O$). The calcium sulfoaluminate cement content of the cement powder blend preferably is 80 wt. % or less, more preferably 75 wt. % or less, in particular 65 wt. % or less, more in particular 60 wt. % or less. If present, the calcium sulfoaluminate cement content of the cement powder blend is usually at least 45 wt. %, preferably at least 50 wt. %.

In another preferred embodiment, the non-Portland cement is a geopolymer cement. Geopolymer cement is in particular preferred for a good strength. It is in particular feasible to provide improved strength, at least compared to calcium aluminate or calcium sulfoaluminate. Geopolymer cements are prepared from mineral powders, such as metakaolin or ground granulated blastfurnace slag (GGBS) and fly ash, comprising calcium, aluminium or silicon which are activated by chemical activators such as alkaline silicates to form inorganic polymers. Particular preferred are geopolymers comprising a chain of silicon (Si) and aluminium (Al), bonded via an oxygen (O). Thus, the chain can be represented by the formula $-(M-O-)_x$, wherein each M independently represents an Si or an Al. The atomic ratio can be chosen within a wide range. Usually, the atomic ratio Si:Al is at least about 1.0, preferably in the range of 1.5-40.

In a preferred embodiment, the metakaolin is represented by the chemical formula $(Na,K)-(Si-O-Al-O-Si-O-)_n$. Herein the atomic ratio Si:Al is usually in the range of 1.0-3.0, preferably 1.5-2.5).

In a further embodiment, the silica-based geopolymer is represented by the formula $(Na,K)-(n(Si-O-)-(Si-O-$ Al—))$_m$. Herein the atomic ratio Si:Al is usually 20 or more, preferably in the range of 15-40.

In a further embodiment, the geopolymer is a sol-gel based geopolymer, represented by the formula (Na,K)—(Si—O—Al—O—Si—O—)$_n$. Herein the atomic ratio Si:Al usually is in the range of 1.5-2.5, preferably about 2.

In a specific embodiment, the geopolymer cement is ground granulated blastfurnace slag (GGBS).

A type of geopolymer cement, such as metakaolin based geopolymer cement or ground granulated blastfurnace slag (GGBS), can be employed as the only geopolymer cement, as the only non-Portland cement, as the only cement component, or it can be employed in combination with another type of geopolymer precursor.

The geopolymer cement content of the cement powder blend preferably is 80 wt. % or less, more preferably 75 wt. % or less, in particular 65 wt. % or less, more in particular 60 wt. % or less. If present, the geopolymer cement content of the cement powder blend is usually at least 45 wt. %, preferably at least 50 wt. %.

Said siliceous fly ash content of the cement powder blend usually is at least 5 wt. % preferably at least 10 wt. %. Said siliceous fly ash content preferably is 20 wt. % or less. Depending on the type of non-Portland cement that is used, the siliceous fly ash or part thereof may be already present in the non-Portland cement, or it may be added separately when preparing the cement powder blend. The siliceous fly ash is typically non-coated. This is advantageous because siliceous fly ash—in uncoated state—has pozzolanic properties and thereby contributes to the cementitious properties of the cement powder. As an alternative or in addition calcareous fly ash may be present, with the proviso that the total fly ash content does not exceed 25 wt. %.

Said limestone content of the cement powder blend usually is at least 5 wt. %, preferably at least 10 wt. %. Said limestone content preferably is 20 wt. % or less. The limestone may be present in the non-Portland cement, depending on the type of non-Portland cement that is used; or it may be added separately when preparing the cement powder blend. Like certain types of non-Portland cement, limestone also contains calcium. In accordance with the invention, it has been found that PVA and a calcium bearing material can react to form a matrix of PVA and the calcium bearing material. In particular, the presence of limestone has been found advantageous to reduce shrinkage of a material according to the invention.

The cement powder blend preferably comprises 25 wt. % PVA or less, more preferably 20 wt. % PVA or less, most preferably 15 wt. % PVA or less. In a particularly preferred embodiment, the PVA content of the cement powder blend is at least 6 wt. %, in particular at least 7 wt. %, more in particular at least 8 wt. %.

The PVA in the cement powder blend or used for preparing the cement powder blend usually has a $D_{10}$ of 300 μm or less, preferably in the range of 170-270 μm. $D_{50}$ is usually 500 μm or less, preferably in the range of 370-450 μm. $D_{90}$ is usually 900 μm or less, preferably in the range of 690-850 μm. $D_{100}$ is usually less than 1500 μm, preferably in the range of 1000-1300 μm. The values are measured using laser diffraction (also known as (Near) Forward Light Scattering, Low Angle Laser Light Scattering or Fraunhofer Diffraction).

The PVA usually has an average molecular weight (Mw) in the range of 25000-155000 g/mol. Preferably, the Mw is at least 27000 g/mol, in particular at least 29000 g/mol. Preferably the Mw is 150000 g/mol or less, e.g. 145000 g/mol or less. In particularly preferred embodiment the PVA has an Mw in the range of 29,000-32,000 g/mol or in the range of 140,000-150,000 g/mol. The Mw can be determined, for instance with size exclusion chromatography in an aqueous buffer, using Mowiol® as calibration standards. Mowiol® is available from Sigma-Aldrich (a Merck subsidiary). Mowiol® 4-88 represents an Mw of 31000 g/mol; Mowiol® 10-98 represents an Mw of 61000 g/mol; Mowiol® represents an Mw of 130000 g/mol.

The PVA usually has a hydrolysis degree of 99% or less. The PVA usually has a hydrolysis degree of more than 75%, preferably of at least 85%, more preferably of at least 87%. In a particularly preferred embodiment the PVA has a hydrolysis degree in the range of 87-89% or 98-99%. Herein Mowiol® can be used as calibration standards.

The polyvinyl alcohol usually has an ester value in the range of 1-250 mg KOH/g, as determinable by EN-ISO 3681:1998. Preferably, the ester value of the PVA is in the range of 5-160 mg KOH/g, more preferably in the range of 7-150 mg KOH/g, in particular in the range of 7-10 mg KOH/g or 130-150 mg KOH/g.

The PVA usually has a viscosity of a 4% aqueous solution at 20° C. as determinable by EN-ISO 12058-1:2002, in the range of 1-40 mPa·s in particular in the range of 2-30 mPa·s. In particular good results have been achieved with a PVA having a viscosity in the range of 1-6 mPa·s or in the range of 25-30 mPa·s.

As an optional component, the cement powder blend may comprise a plasticizer, usually a polycarboxylic ether plasticizer, preferably a modified polycarboxylic-ether. The content of polycarboxylic ether plasticizer usually is in the range of 0-6 wt. %, preferably in the range of 0.5-5 wt. %, more preferably in the range of 1.0-4 wt. %, based on the weight of the non-Portland cement.

In a particularly preferred embodiment, the cement powder blend according to the invention comprises 5-15 wt. % polyvinylalcohol, 50-80 wt. % non-Portland cement, has a siliceous fly ash content of 5-20 wt. % and a limestone content of 5-20 wt. %.

The cement powder blend can be made by dry-blending the components. This can be done in generally known equipment under ambient conditions.

The construction slurry, in particular the cement slurry, such as the cement paste can be made from the cement powder blend according to the invention by mixing with water in a manner known per se. The resultant slurry, such as the paste, can thereafter by used in a manner known per se for any application of interest, in particular in the production of a concrete according to the invention, as mortar or for a use specified elsewhere herein. For the production of concrete, typically aggregate is added to the construction slurry, such as the paste. The aggregate may be fine aggregate (particle size <4 mm), coarse aggregate (particle size 4-20 mm) or a combination thereof. It is an advantage of the invention that the concrete can be free of steel reinforcement materials and/or fibrous reinforcement materials (such as polymeric fibres). However, if desired, the concrete can contain such reinforcement material.

In a preferred embodiment, the hardened slurry, such as the hardened cement paste according to the invention, has an expansion of 0-25%, preferably as determined with sample length measurements during curing at 60° C.

In a preferred embodiment, the hardened slurry, such as the hardened cement paste, according to the invention has a stiffness of 1.0-3.0 N/mm$^2$, more preferably 1.5-2.5 N/mm$^2$ measured by means of direct tensile strength at 7 days.

In a further embodiment, the hardened slurry, such as the hardened cement paste according to the invention has a tensile strength of 3.5-4.5 MPa measured by means of direct tensile strength at 7 days. Preferably, the hardened cement paste according to the invention exhibits high strength and ductility at early ages, i.e. at 14 days after starting curing the construction slurry, preferably after 10 days, in particular after 7 days.

In a preferred embodiment, the cement slurry according to the invention has an initial setting time of 70-130 min, preferably 80-120 min, more preferably 90-110 min. Preferably, the cement slurry according to the invention has a final setting time of 170-270 min, preferably 180-250 min, in particular 190-230 min. An advantage of a fast setting time is that fewer time is needed for the construction process, hence making the overall process more time and cost efficient.

The concrete according to the invention preferably is composed of 6-24 wt. % cement powder blend according to the invention.

The concrete according to the invention preferably comprises 4-16 wt. % water.

The concrete according to the invention preferably comprises 20-50 wt. % fine aggregates (0-4 mm) and/or 35-60 wt. % coarse aggregates (4-20 mm), with the proviso that the total aggregate content is 60-90 wt. %

The invention will now be illustrated by the following examples.

EXAMPLE 1: PREPARATION OF CONSTRUCTION SLURRY FROM CALCIUM ALUMINATE CEMENT AND PVA

A cement powder blend with 15 wt. % of polyvinyl alcohol (Mowiol 4-88), with ester value of 8 mg KOH/g, viscosity 28 mPa·s and $D_{10}=233$ μm, $D_{50}=440$ μm, $D_{90}=767$ μm and $D_{100}=1132$ μm, combined with 85 wt. % calcium aluminate cement (Calumex Quick Caltra) was prepared. The resultant powder blend was mixed with water (in a weight to weight ratio water to powder blend of 0.4) to form a cement slurry (cement paste) at 20° C.

EXAMPLE 2: PREPARATION OF CONSTRUCTION SLURRY FROM CALCIUM ALUMINATE CEMENT, PVA, LIMESTONE AND FLY ASH

A cement powder blend with 15 wt. % of polyvinyl alcohol (Mowiol 4-88), with ester value of 8 mg KOH/g, viscosity 28 mPa·s and $D_{10}=233$ μm, $D_{50}=440$ μm, $D_{90}=767$ μm and $D_{100}=1132$ μm, combined with 55.25 wt. % calcium aluminate cement (Calumex Quick Caltra), 17 wt. % limestone and 12.25 wt. % fly ash was prepared. The resultant powder blend was mixed with water (in a weight to weight ratio water to powder blend of 0.4) to form a cement slurry (cement paste) at 20° C.

EXAMPLE 3: PREPARATION OF A REFERENCE CONSTRUCTION SLURRY FROM PORTLAND CEMENT, PVA, LIMESTONE AND FLY ASH

A cement powder blend with 15 wt. % of polyvinyl alcohol (Mowiol 4-88), with ester value of 8 mg KOH/g, viscosity 28 mPa·s and $D_{10}=233$ μm, $D_{50}=440$ μm, $D_{90}=767$ μm and $D_{100}=1132$ μm, combined with 55.25 wt. % CEM I 42.5 Portland cement, 17 wt. % limestone and 12.25 wt. % fly ash was prepared. The resultant powder blend was mixed with water (in a weight to weight ratio water to powder blend of 0.4) to form a cement slurry (cement paste) at 20° C.

EXAMPLE 4: SETTING TIME

The initial setting time of the construction slurries according to Examples 1, 2 and 3 were evaluated. Results are shown in the Table below.

|  | Initial setting (min) | Final setting (min) |
| --- | --- | --- |
| Ex 1 | 90 | 190 |
| Ex 2 | 110 | 230 |
| Ex 3 | 640 | 1000 |

It was shown that the construction slurries according to the invention, i.e. comprising calcium aluminate cement set much more quickly compared to construction slurries comprising Portland cement.

EXAMPLE 5: DIRECT TENSILE STRENGTH AT 7 DAYS

The cement slurries of Example 1 and 2 were fully sealed with water on the surface and cured up to 7 days. Then the direct tensile strength of the hardened cement slurry was determined (following AASHTO T314-07) and stiffness was calculated from the strain-stress diagrams.

Results of the test are presented in the Table below.

|  | Tensile Strength (MPa) | δl at Fmax (mm) | Strain at break (%) | Elastic modulus (N/mm2) |
| --- | --- | --- | --- | --- |
| Ex 1 | 4.22 | 0.7 | 4.00 | 1.99 |
| Ex 2 | 3.70 | 0.8 | 4.51 | 1.32 |

From the experiment it was concluded that a flexible concrete according to the invention (made using a powder blend according to the invention) has a ductile behaviour. This property distinguishes the flexible concrete from normal concrete mixes. The ductility presented can have an effect in how a road is constructed and allow for less or no joints that will increase driving comfort. This property will not compromise the environmentally friendly aspect of concrete roads as the material remains a cement based material.

Another important property of the flexible concrete is that the ductility is not directly connected to its strength which allows strength optimization without sacrificing the ductile character. This is also not common for normal concrete where there is a relationship between mechanical properties and elasticity.

Usage of this material can vary as it has a good affinity both with concrete and with asphalt. This would allow usage in different pavement layers on top of already existing layers as a combination layer or even as a repair material.

EXAMPLE 6: PREPARATION OF CONSTRUCTION SLURRY FROM GEOPOLYMER CEMENT AND PVA

Cement powder blend with 15 wt. % of polyvinyl alcohol (Mowiol 4-88), with ester value of 8 mg KOH/g, viscosity 28 mPa·s and $D_{10}$=233 µm, $D_{50}$=440 µm, $D_{90}$=767 µm and $D_{100}$=1132 µm, combined with 85 wt. % geopolymer cement are prepared.

The used geopolymer cements for different blends are either metakaolin or ground granulated blastfurnace slag (GGBS).

The resultant powder blend is mixed with water (in a weight to weight ratio water to powder blend of 0.4) to form a cement slurry (cement paste) at 20° C.

Setting time and tensile strength are determined as described in Examples 4 and 5 respectively.

EXAMPLE 7: PREPARATION OF CONSTRUCTION SLURRY FROM CALCIUM ALUMINATE CEMENT, PVA, LIMESTONE AND FLY ASH

A cement powder blend with 15 wt. % of polyvinyl alcohol (Mowiol 4-88), with ester value of 8 mg KOH/g, viscosity 28 mPa·s and $D_{10}$=233 µm, $D_{50}$=440 µm, $D_{90}$=767 µm and $D_{100}$=1132 µm, combined with 55.25 wt. % calcium aluminate cement (Calumex Quick Caltra), 17 wt. % limestone and 12.25 wt. % fly ash is prepared. The resultant powder blend is mixed with water (in a weight to weight ratio water to powder blend of 0.4) to form a cement slurry (cement paste) at 20° C.

The used geopolymer cements for different blends are either metakaolin or Ground granulated blastfurnace slag (GGBS).

Setting time and tensile strength are determined as described in Examples 4 and 5 respectively.

The invention claimed is:

1. A cement powder blend comprising, based on total weight
   45-90 wt. % non-Portland cement;
   5-30 wt. % polyvinylalcohol; the blend having a content of
   0-25 wt. % siliceous fly ash; and
   0-25 wt. % limestone, wherein the polyvinylalcohol has a size distribution with $D_{10}$=170-270 µm, $D_{50}$=370-450 µm, $D_{90}$=690-850 µm and $D_{100}$=1000-1300 µm.

2. The cement powder blend according to claim 1, comprising
   50-80 wt. % non-Portland cement; and further comprising
   5-20 wt. % siliceous fly ash;
   5-20 wt. % limestone; and
   5-15 wt. % polyvinylalcohol.

3. The cement powder blend according to claim 1, wherein the non-Portland cement is a geopolymer cement comprising metakaolin.

4. The cement powder blend according to claim 3, wherein the non-Portland cement is a geopolymer cement comprising a silica-based geopolymer represented by the formula (Na,K)-n(Si—O—)—(Si—O—Al—).

5. The cement powder blend according to claim 1, wherein the non-Portland cement is a geopolymer cement comprising a sol-gel-based geopolymer represented by the formula (Na,K)—(Si—O—Al—O—Si—O—).

6. A construction slurry of a cement powder blend according to claim 1 and water in a weight to weight ratio water to the non-Portland cement in the range of 0.2-0.7.

7. The construction slurry according to claim 6, wherein the construction slurry is a cement slurry.

8. A hardened construction slurry of claim 6.

9. The hardened construction slurry according to claim 8, wherein at least a substantial part of the polyvinyl alcohol is present in the form of hybrid particles composed of non-Portland cement and polyvinyl alcohol.

10. The hardened construction slurry according to claim 8, wherein the construction slurry is a hardened cement slurry having an expansion of 0-25% determined with sample length measurements during curing at 60° C.

11. The hardened construction slurry according to claim 8, wherein the construction slurry is a hardened cement slurry having a stiffness of 1.0-2.5 N/mm² measured by means of direct tensile strength at 7 days, as measured at about 20° C.

12. A concrete comprising the construction slurry of claim 6;
   20-50 wt. % fine aggregates, having a particle size of less than 4 mm; and
   35-60 wt. % coarse aggregates, having a particle size in the range of 4-20 mm;
with the proviso that the total aggregate content is 60-90 wt. %.

13. A product, comprising concrete according to claim 12, wherein the product is selected from the group consisting of infrastructural elements, buildings, concrete ware, and elements for pre-fab buildings.

14. The product according to claim 13, wherein the product is a building.

15. A cement powder blend comprising, based on total weight
   45-90 wt. % non-Portland cement;
   5-30 wt. % polyvinylalcohol; the blend having a content of
   0-25 wt. % siliceous fly ash; and
   0-25 wt. % limestone, wherein the polyvinyl alcohol has an ester value in the range of 1-250 mg KOH/g, as determinable by EN-ISO 3681:1998 and/or wherein the polyvinyl alcohol is a polyvinyl alcohol of which a 4% aqueous solution has a viscosity, at 20° C., as determined by EN-ISO 12058-1: 2002, in the range of 1-40 mPa·s.

16. The cement powder blend according to claim 15, comprising
   50-80 wt. % non-Portland cement; and further comprising
   5-20 wt. % siliceous fly ash;
   5-20 wt. % limestone; and
   5-15 wt. % polyvinylalcohol.

17. A construction slurry of a cement powder blend according to claim 15 and water in a weight to weight ratio water to the non-Portland cement in the range of 0.2-0.7.

18. The construction slurry according to claim 17, wherein the construction slurry is a cement slurry.

19. A hardened construction slurry of claim 17.

20. The hardened construction slurry according to claim 19, wherein at least a substantial part of the polyvinyl alcohol is present in the form of hybrid particles composed of non-Portland cement and polyvinyl alcohol.

21. The hardened construction slurry according to claim 19, wherein the construction slurry is a hardened cement slurry having an expansion of 0-25% determined with sample length measurements during curing at 60° C.

22. The hardened construction slurry according to claim 19, wherein the construction slurry is a hardened cement slurry having a stiffness of 1.0-2.5 N/mm² measured by means of direct tensile strength at 7 days, as measured at about 20° C.

23. A concrete comprising the construction slurry of claim 17;
   20-50 wt. % fine aggregates, having a particle size of less than 4 mm; and
   35-60 wt. % coarse aggregates, having a particle size in the range of 4-20 mm;

with the proviso that the total aggregate content is 60-90 wt. %.

24. A product, comprising concrete according to claim 23, wherein the product is selected from the group consisting of infrastructural elements, buildings, concrete ware, and elements for pre-fab buildings.

25. The product according to claim 24, wherein the product is a building.

26. The cement powder blend according to claim 15, wherein the non-Portland cement is a geopolymer cement comprising metakaolin.

27. The cement powder blend according to claim 26, wherein the non-Portland cement is a geopolymer cement comprising a silica-based geopolymer represented by the formula (Na,K)-n(Si—O—)—(Si—O—Al—).

28. The cement powder blend according to claim 15, wherein the non-Portland cement is a geopolymer cement comprising a sol-gel-based geopolymer represented by the formula (Na,K)—(Si—O—Al—O—Si—O—).

* * * * *